(12) United States Patent
Sanger et al.

(10) Patent No.: US 7,826,097 B2
(45) Date of Patent: Nov. 2, 2010

(54) ASYMMETRICAL DIGITAL FILTERS FOR DOT GAIN ADJUSTMENTS

(75) Inventors: Kurt M. Sanger, Rochester, NY (US); Gustav J. Braun, Fairport, NY (US); Peter D. Burns, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 650 days.

(21) Appl. No.: 11/754,549

(22) Filed: May 29, 2007

(65) Prior Publication Data

US 2008/0297813 A1    Dec. 4, 2008

(51) Int. Cl.
*H04N 1/405* (2006.01)

(52) U.S. Cl. .................... 358/3.06; 358/3.05; 358/3.3

(58) Field of Classification Search .............. 358/1.9, 358/2.1, 2.99, 3.03–3.06, 3.16, 3.21–3.23, 358/3.3–3.32
See application file for complete search history.

(56) References Cited

U.S. PATENT DOCUMENTS

| | | | |
|---|---|---|---|
| 4,630,125 A | 12/1986 | Roetling | |
| 5,164,742 A | 11/1992 | Baek et al. | |
| 5,208,871 A | 5/1993 | Eschbach | |
| 5,250,934 A | 10/1993 | Denber et al. | |
| 5,255,085 A | 10/1993 | Spence | |
| 5,258,854 A | 11/1993 | Eschbach | |
| 5,293,539 A | 3/1994 | Spence | |
| 5,483,351 A | 1/1996 | Mailloux et al. | |
| 5,680,485 A | 10/1997 | Loce et al. | |
| 5,721,625 A | 2/1998 | Furusawa et al. | |
| 5,767,887 A | 6/1998 | Warner | |
| 6,115,140 A | 9/2000 | Bresler et al. | |
| 6,204,874 B1 | 3/2001 | Michelson | |
| 6,863,360 B2 | 3/2005 | Sanger | |
| 2004/0032600 A1 | 2/2004 | Burns et al. | |

OTHER PUBLICATIONS

ANSI/CGATS.41993, 1993, p. 7.
E.R. Dougherty; An Introduction to Morphological Image Processing, SPIE, vol. TT9, Chapter 3, 1992, pp. 31-62.
ANSI/CGATS TR 001-1995, pp. 1-30.

*Primary Examiner*—Thomas D Lee
*Assistant Examiner*—Stephen M Brinich
(74) *Attorney, Agent, or Firm*—Nelson Adrian Blish

(57) ABSTRACT

A method for adjusting dot-gain for a halftone binary bitmap file comprises inputting a halftone binary bitmap file consisting of binary pixels (400) to an asymmetric digital filter (500). The binary pixels are filtered with the asymmetric digital filter and generates multi-level pixels (506). The multi-level pixel are compared to a preset level (408) and generates a binary pixel output (410). The binary pixel output is collected and forms an adjusted halftone binary bitmap file (270).

27 Claims, 15 Drawing Sheets

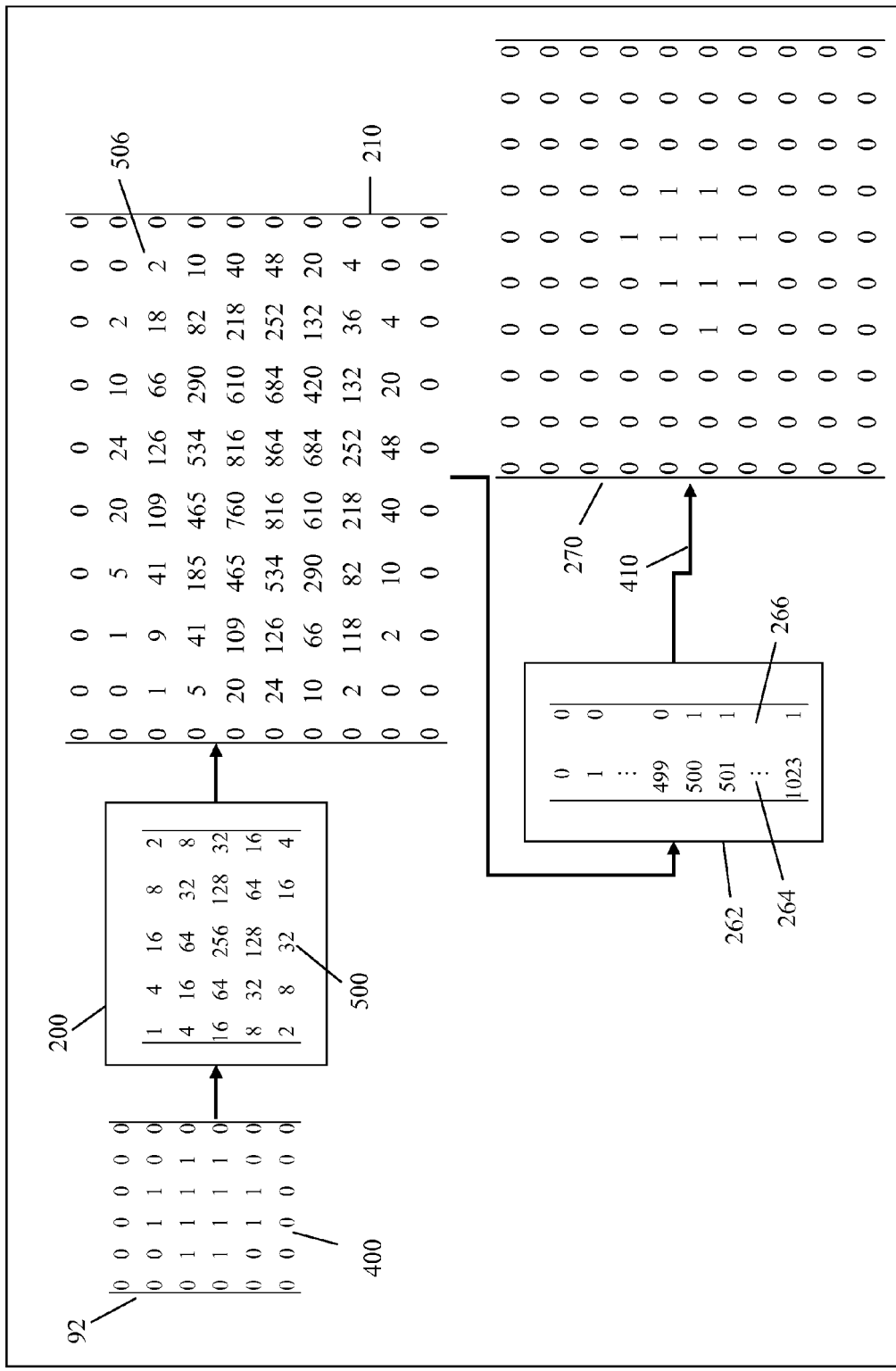

ASYMMETRICAL DIGITAL FILTERS FOR DOT GAIN ADJUSTMENTS

CROSS REFERENCE TO RELATED APPLICATIONS

Reference is made to commonly-assigned copending U.S. patent application Ser. No. 10/223,228, (U.S. Patent Publication No. US2004/0032600 A1) filed Aug. 19, 2002, entitled HALFTONE DOT-GROWTH TECHNIQUE BASED ON MORPHOLOGICAL FILTERING, by Burns et al., the disclosure of which is incorporated herein.

FIELD OF THE INVENTION

This invention relates in general to proofing a bitmap file prior to making printing plates and in particular to adjusting dot-gain for a halftone binary bitmap.

BACKGROUND OF THE INVENTION

In a digital printing workflow there is a need to be able to proof bitmap files used to make printing plates. Presently, customer artwork consisting of contone images, linework, and text, is first sent to a digital halftone proofer or inkjet printer. The artwork is corrected until the proof is approved for the press. In the case were the artwork is proofed on a digital halftone proofer such as described in U.S. Pat. No. 5,164,742 (Baek et al.), the raster image processor (RIP) adjusts the input continuous tone data using a calibration dot-gain curve such that the tone-scale of the proof matches the tone-scale of the press-sheet. After the proof is approved, the job is sent to a second RIP which applies a second dot-gain curve for generating the plate used in the press-run.

The first and second RIPs may be the same but are typically separate and may be located apart from each other. The first and second RIPs are preferably the same type and version such that the halftone dots created and algorithms used by each device are an exact match. Many times the two RIPs are not an exact match, which can create problems. Sometimes incorrect dot-gain correction files are used. Sometimes the artwork is changed in-between creating the proof and the plates and the press-run no longer matches the approved proof.

Another disadvantage in the current system is that an error in the creation of the bitmaps for printing is not known until the plates are loaded onto the press and the press-run is started. For a press capable of over 1,000 impressions per hour a considerable amount of production is lost if the plates are found to be corrupt and need to be remade.

An important aspect in creating a halftone proof is predicting dot-gain or tone-scale. Dot-gain is a known phenomenon attributable to ink spread, ink absorption by the print media, and optical effects between the ink and the paper. The dot-gain varies with the size and shape of the halftone dots, the printing device, the inks, and the paper used, etc. For a digital proof, halftone dots in a color separation are composed of micro-pixels that give the halftone dot its shape and size. Dot-gain for a digital proof corresponds to increasing dot size by adding micro-pixels. Dot-loss for a digital proof corresponds to decreasing dot size by eliminating micro-pixels. Dot-gain correction consists of adding and subtracting gain to match the response at different percent dot inputs.

In the printer described in U.S. Pat. No. 5,164,742 many steps are required to match the press. First, the exposure for each color plane is adjusted to match the solid area density. Second, the dot-gain for each color plane is adjusted to achieve a dot-gain match at different halftone tint levels. Third, the dot-gain curves and density levels may be fine tuned to achieve either a good neutral match in the three color overprints or a color match for flesh tones. For some work, other memory colors such as green grass or light blue sky may be matched as the critical color. Finally, the dot-gain curves may be further adjusted to deliver better performance in the highlight, or shadow areas. These steps are critical and typically take much iteration between the proof operator and the customer to achieve the look that the customer desires. It is important to be able to adjust the proofer to achieve this look as there are other controls on the press that may be adjusted to affect the dot-gain and tonal control of the press-run. By adjusting the performance of the proofer, the customer is selecting the quality of the proofs that will be used by the pressmen to match.

Once the proofer has been setup to match the press, the customer uses subsequent proofs to setup the press. This is an important point. The proofer setup is used to simulate the press such that the pressman may then use the proofs to setup the press to achieve the customer's intent. Every job going through the proofer will be adjusted with a setup. There may be different setups for each press or press type. There may also be different setups for different customers using the same proofer. Finally there may also be standard setups that are used to simulate jobs across many different presses.

The same job is typically "ripped" again when going to press. This time the RIP is programmed to generate 50% area coverage on plate for the 50% color input. The press is then run to deliver a fixed amount of gain at the 50% input level. Dot-gain is due to the smearing of the ink from the plate to a blanket, the smearing of ink from the blanket to the job paper, and the optical gain of the ink on top of the paper. The control is usually split between the plate making device delivering 50% area coverage for a 50% input, and the press delivering 50% plus its intrinsic dot-gain. Typical dot-gain levels for a Web-fed offset press are 15% to 25% at the 50% input level. Because the dot-gain occurs on the press instead of at the plate writer the bitmaps used to create the plate will not contain enough gain to make the proof. Proofs made from these bitmaps will be washed out and the contrast will be significantly reduced. Colors will also shifts as the gain in each color will be proportional to the dot area coverage.

Other digital halftone printing devices such as that disclosed in U.S. Pat. No. 6,204,874 (Michelson) use a binary proofing media that does not allow for adjusting the density level of the solid colorants. A different process is used to adjust these devices for a close press match, including adjusting the tone-scale or dot-gain curve used to make the bitmap file. However, the ideal dot-gain curve on these systems is still different from the dot-gain curves used to make the plates even if the same machine is imaging the plate and the proof as disclosed in U.S. Pat. No. 6,204,874.

Inkjet printing devices are also sometimes used to make a proof. These devices typically image from 300 dpi to 1440 dpi writing resolutions using multiple cyan, magenta, yellow, and sometimes black inks. In addition software such as "Best Screen Proof" available from Best Gmbh, or Black Magic available from Serendipity Software Pty Ltd., may be used to simulate the printing of a halftone screen. This software attempts to measure the halftone screen and adjust the printed output to achieve a close color match to a given target. Resolution of the inkjet devices does not allow for a good match of the halftone dot structure. The color match developed does simulate the tone-scale or dot-gain correction, but only through the driving of the overlapping colors on the proof. The quality of the halftone in the printed proof is significantly compromised. Dots in the highlight and shadow areas are destroyed in trying to match the overall density level in these systems. This is because the inkjet output drops are too large. Therefore one inkjet drop is used to replace many halftone dots in the highlight or bright areas, while one inkjet hole is used to replace many halftone holes in the shadows.

A halftone screen at 150 lines per inch, 6 lines per mm, covers an area of approximately 28,674 $um^2$. An inkjet printer with a 3 pL drop size will produce a dot with a diameter of about 25 um covering an area of 625 $um^2$. This may vary depending upon the spread into the paper. A single inkjet drop represents a 2.18% change in area within a 150 line screen halftone. To achieve finer resolution the Best Screen Proof, and Black Magic, software use additional inks to image multi-level colorants. Typically light cyan and light magenta inks are added to the cyan, magenta, yellow, and black primaries to achieve finer control of the tone-scale. While this creates a proof with a close visual color match, the structure of the halftone dots within the image is seriously degraded.

A conventional proofing solution is to RIP the file for proofing separate from ripping the file for printing, adding dot-gain to the proofing file as part of the ripping process. U.S. Pat. No. 5,255,085 (Spence) describes a method to adjust the tone reproduction curve of a press or output printer. U.S. Pat. No. 5,255,085 creates a target from the press or desired output proof, benchmarks the characteristics of the proofing device, and discloses a method to generate a lookup table to adjust the dot-gain of the original file to achieve the aim on the proofing device. U.S. Pat. No. 5,293,539 (Spence) adds adaptive process values to interpolate between measured Benchmark and Aim data sets to calibrate the dot-gain tone-scale curve at other screen rulings, screen angles, and dot shapes. Utilizing these techniques to modify the dot-gain curves and hence the tone-scale curves of the proofing device increases the chances for error. The input file and its subsequent components must be available for both RIPs. The same versions of each file and components must be specified. The same fonts must be available for both RIPs. The correct dot-gain curve must be specified at both RIPs. The chances for error to occur increase with each ripping operation, especially when the RIPs are located at separate sites.

Ripping the file twice is also time consuming. Each RIP operation must read the input files, decide where each of the components is to be placed in the output print, convert continuous tone images using the correct dot-gain curve into high resolution halftones, render text and linework, and output a high resolution bitmap which represents the composite image. This is repeated for each color in the output print.

Once commercial halftone proofer implements dot-gain by modifying the code values being printed through a curve prior to converting the code values into the halftone bitmap with the raster image processor. The dot-gain is only applied to the continuous tone image data and not the line work or text. The dot-gain may be adjusted for each of the primary colors cyan, magenta, yellow, and black. A dot-gain curve may also be specified for spot colors orange, green, red, blue, white, and metallic. A dot-gain curve may also be specified for a recipe color which is imaged using a single bitmap in combination with two or more standard colors at unique exposure levels. A dot-gain curve may also be specified for each colorant within a recipe color. In this last case more than one bitmap is used, however the halftone dots are at the same screen ruling, screen angle, and phase, such that each halftone dot in each color substantially overlap.

A typical example is a target curve. Such a target might specify that the 50% cyan halftone should print at 67%, the 25% cyan halftone should print at 35%, and the 75% cyan halftone should print at 80%. A benchmark proof is then run and measured. Dot area is calculated based on measured density using the equation defined by Murray-Davies. Equation 1 is the Murray-Davies equation is defined in ANSI/CGATS.41993, 1993, p. 7. A dot-gain adjustment curve is then created to add the correct amount to cyan to achieve the target values at the target inputs. For instance in this example we might find that an output value of 35% was achieved at an input level of 30% in the benchmark proof. Therefore 5% dot-gain at the 25% input level is added to achieve the 35% target. At the 50% level we may find we achieved the target level of 67% at an input level of 57% requiring us to add 7% at the 50% input. At the 75% level we may find we achieved the 80% target at the 76% input requiring 1% dot-gain. In actual practice we may measure the dot-gain in 5% or 10% steps with some additional measurements between 0 to 10% and 90 to 100%. A spline curve is usually fit to the resulting dot-gain curve to provide a table in 1% input increments or less. Smoothing is sometimes performed on the input target and benchmark data to further reduce artifacts in the adjustment process.

Perup Oskofot has shown a software program, which operates on high resolution scans from their scanners. The program takes a binary high-resolution scan of a halftone film and de-screens it to a lower resolution continuous tone image. Typically the scan resolution is 2400 dpi. The resulting continuous tone image may be 8 bits per pixel at 300 dpi resolution. A dot-gain curve is then applied to the de-screened image. The adjusted image is then ripped to a bitmap image at 2400 dpi. This software system was disclosed at Drupa 2000, a tradeshow. One problem with this method is that it requires a re-ripping step. To accomplish this requires a RIP. Plus it has to be known what the original halftone screen shape, screen ruling, and screen angle were in order to faithfully reproduce it with the re-ripping step. Another problem is that all RIPs are not the same. There are subtle differences between them such as the method that they use to add noise to hide the quantization affects in screening the image. This means that one RIP may not sufficiently reproduce all the screens that the customer might digitize. Another problem with this method is that it is extremely slow. A small 8×10 inch image at 2400 dpi scanned resolution took more than an hour to process a single color plane.

Additionally, some customers have halftone films, which they would like to use in their digital workflow. These customers scan the film at a high resolution, for example 100 pixels/mm, and quantize each pixel to a binary value. Because the dot-gain is built into the film, there is no method other than de-screening the bitmap file, adding dot-gain, and re-ripping the file, to calibrate the output print. If the original film was made using an optical technique then the dot shape, screen ruling, and screen angle may not be an exact match to a digital RIP. De-screening and re-screening the high resolution scan may not faithfully reproduce the original screens.

A method of shifting and adding a bitmap image with itself to thin the image displayed is disclosed in U.S. Pat. No. 5,250,934 (Denber et al.). U.S. Pat. No. 5,250,934 discloses a method of setting a bit to an intermediate level if it is diagonally between two active bits using shifting, logical and, and a logical or operation.

U.S. Pat. No. 5,483,351 (Mailloux et al.) discloses using a 4×4 input to a lookup table to determine how to operate on the central 2×2 pixels to implement halfbit or fullbit dilation and erosion in U.S. Pat. No. 5,483,351. Mailloux et al. has the advantage of knowing some of the surrounding pixels in deciding how to dilate or erode the pixels in the center. U.S.

Pat. No. 5,258,854 (Eschbach) teaches how to resize bitmap images in small amounts less than one full bit in size.

Logically combining two morphological filter pairs and an original image to create an output image is disclosed in U.S. Pat. No. 5,680,485 (Loce et al.). The morphological filters described are erosion filters, one of which has less erosion than desired and the other having more erosion than desired. Logically combining combinations of the original image with the two eroded images provides for a method of obtaining an intermediate result.

A method of resizing an input bitmap is described in U.S. Pat. No. 5,208,871 (Eschbach), which simulates a scan of an output image from an input bitmap such that the scan resolution is different from the input bitmap. Error diffusion is utilized to quantize the output bitmap into the desired output bit resolution. This example uses error diffusion to spread out the error in the quantization of a multi-level pixel into a reduced number of output states.

U.S. Pat. No. 6,115,140 (Bresler et al.) uses a de-screened version of an original image, and dilated and eroded versions of the original image to select a combination of the original, dilated, and eroded images to effect a dot-gain or tone-scale change in an input bitmap image. U.S. Pat. No. 6,115,140, FIG. 5B shows an original halftone image input into block H 1 along with an eroded version (HE), and two dilated versions (HD 1 and HD 2). Then a weight based on de-screened versions of the original halftone (CO), the color corrected original (CI), the eroded original (CE), and the two dilated originals (CD 1 and CD 2) is calculated. The de-screened images are used to select which of the four halftone images, H 1, HE, HD 1, and HD 2, are transferred into H 1 and H 2. The weighting function is then used to merge bitmap versions of H 1 and H 2 together into the tone-scaled output bitmap (HO). How to de-screen is not disclosed, nor exactly how to calculate which bit of H 1 and H 2 is used to drive the output bit HO. The need to use error diffusion to distribute the error in selecting between H 1 or H 2 is not mentioned.

In U.S. Pat. No. 6,115,140 dilation is described as growing a single pixel completely around the halftone feature. A second dilation grows two pixels completely around the halftone feature. Similarly erosion subtracts a single pixel completely around the halftone feature.

U.S. Pat. No. 6,115,140 does not teach how to perform de-screening. U.S. Pat. No. 4,630,125 (Roetling) performs de-screening by comparing the number of white and dark pixels within a specified area. U.S. Pat. No. 4,630,125 also states that "A partial solution known in the art is to spatially filter the halftone image with a low pass filter." U.S. Pat. No. 4,630,125 teaches that the spatial filter method is not exact as it tends to blur the original image.

U.S. Pat. No. 5,767,887 (Warner) discloses using a Raster Image Processor with two lookup tables for dot-gain. One lookup table is recommended for creating a proof. A second lookup table or dot-gain is recommended for making a plate. The image is processed two times through the raster image processor. Warner disclosed imaging the proof and the plate on the same machine, with the same raster image processor. This is not always possible if the proof and the plate are needed in different locations.

U.S. Pat. No. 5,721,625 (Furusawa et al.) discloses using a digital filter to filter an input continuous tone image and use the filtered output to select from multiple dot generators or raster image processors. Furusawa selects a dot created using a traditional amplitude modulated screen for areas of the print that contain low frequency information. Furusawa selects a dot created using frequency modulated screens for areas of the print that contain high frequency information. The frequency content of the image is output from the digital filter.

U.S. Pat. No. 6,863,360 (Sanger) discloses using digital filters to filter a binary bitmap, then create a weighted sum and compare against a threshold to adjust the dot gain. U.S. No. 6,863,360 discloses using a blur filter, a low pass filter, a band pass filter, or a high pass filter. In U.S. No. 6,863,360 there is a need for a digital filter that creates a maximum number of unique output states. Sanger also discloses modifying the halftone bitmap used for printing to create a proof U.S. Patent Publication No. 2004/0032600 A1 (Burns et al.) describes methods for growing halftone dots based on asymmetrical morphological filters. This work also teaches the recursive use of these filters in one-dimensional form in one direction and then a second direction. Although the objective of this method and the current invention are similar; the controlled growing or shrinking of halftone dots, the methods are different in two important ways.

The current invention does not involve the step of erosion or dilation, which are well-established methods for morphological image processing [E. R. Dougherty, *An Introduction to Morphological Image Processing*, SPIE, Bellingham Wash., Ch. 3, 1992]. In these operations, a structuring element, an array, is moved (translated) over the input binary image. For each translated location the degree overlap of the structuring element and the objects in the image array are used to either add to or subtract from the local binary element (dot). If the structuring element dimension is not symmetrical about its center it can be considered to be an asymmetrical morphological filter. If, in addition, the structuring element is a vector, the operation will be a one-dimensional morphological filter. The use of the structuring element [0 1 1] would constitute an asymmetrical one-dimensional morphological filter. If this were used in a dilation operation objects would grow on one side only (by convention, the right-hand side).

The current invention includes the step of discrete convolution of the image array with an asymmetrical filter array. The present invention is defines an asymmetrical filter as one whose filter kernel (a vector for a one-dimensional filter and a two-dimensional matrix for a two-dimensional filter) is not an even function either x- and y-directions or both. For clarification, the following examples are presented;

Filters with the following kernels are considered symmetrical;

$$[0.1\ 0.8\ 0.1]$$

$$[1\ 1]$$

$$[0.1\ 0.4\ 0.4\ 0.1]$$

$$\begin{bmatrix} 0 & 1 & 0 \\ 1 & 1 & 1 \\ 1 & 1 & 1 \\ 0 & 1 & 0 \end{bmatrix}$$

Filters with the following kernels are considered asymmetrical;

$$[0.4\ 0.4\ 0.2]$$

$$[0\ 1]$$

-continued

[0.05 0.1 0.75 0.1]

$$\begin{bmatrix} 0 & 1 & 1 \\ 1 & 1 & 1 \\ 1 & 1 & 1 \\ 0 & 1 & 0 \end{bmatrix}$$

Note also that the sum of the filter kernel elements are not constrained to be equal to 1.0.

The discrete convolution step is followed by a thresholding of the resultant filtered image array at each pixel. The discrete convolution, however, it is based an arithmetic operation that treats image array values and filter coefficients as ordinary continuous variables, rather than overlapping objects as in U.S. Patent Application Publication No. 2004/0032600 A1.

The second difference between the current invention and U.S. Patent Application Publication No. 2004/0032600 A1 can be seen when each is implemented as a series of two, one-dimensional operations. Since the morphological operations of U.S. Patent Application Publication No. 2004/0032600 A1 result in a binary image array, the result after one operation will be the growing or shrinking of each image dot by one or more pixels in single direction, e.g., the right edge. Thus, a 2×2 square dot might grow to 2×3. This enlarged dot will then be subject to dilation or erosion in the orthogonal direction, and might grow to 3×3. Note that in each step an entire boundary is extended.

In the current invention, as implemented as two one-dimensional operations, the intermediate result is not thresholded, but stored as a continuous (or multi-level) array. This array is then filtered by a one-dimensional discrete convolution operation, prior to the thresholding operation. As will be shown below, the result is that the halftone dots can be grown by single pixel, if desired, by selection of the threshold level. Since this facilitates the selection between a more output image states (levels of dot growth), it represents an improvement of the previously disclosed method of U.S. Patent Application Publication No. 2004/0032600 A1.

Commonly-assigned U.S. Pat. No. 6,863,360 adjusts dot-gain for a halftone binary bitmap file by inputting a halftone binary bitmap file consisting of binary pixels to a digital filter, then filtering the binary pixels with the digital filter and generating a weighted sum of the pixels, using the weighted sum, producing a multi-level pixel and then comparing the multi-level pixel to a preset level, next a binary pixel output is generated, the output are collected and an adjusted halftone binary bitmap file is formed. U.S. Pat. No. 6,863,360 has a problem in that the digital filter used has a limited number of output states resulting in a quantization artifact on its output. The present invention improves upon U.S. Pat. No. 6,863,360 by utilizing an asymmetric filter to maximize the number of possible output states and reduce the quantization errors in the output bitmap.

SUMMARY OF THE INVENTION

The present invention relates to a method for adjusting dot-gain for a halftone binary bitmap file involving the steps of inputting a halftone binary bitmap file consisting of binary pixels to an asymmetric digital filter, then filtering the binary pixels with the asymmetric digital filter and generating a weighted sum of the pixels. Using the weighted sum, a multi-level pixel is produced and then compared to a preset level and a binary pixel output is then generated. The binary pixel output is then collected forming an adjusted halftone binary bitmap file. The asymmetric digital filter maximizes the number of levels out of the filter, thereby increasing the number of discrete sizes of the output halftone dot.

The present invention also relates to a method for adjusting dot-gain for a halftone binary print by inputting a halftone binary bitmap file consisting of binary pixels to an asymmetric digital filter, filtering the binary pixels with the asymmetric digital filter and generating a weighted sum of the pixels; producing a multi-level pixel from the weighted sum; comparing the multi-level pixel to a preset level and generating a binary pixel output; collecting the binary pixel output and forming an adjusted halftone binary bitmap file; and printing the halftone binary bitmap file.

The present invention also relates to a method for adjusting dot-gain for a printing plate by inputting a halftone binary bitmap file consisting of binary pixels to an asymmetric digital filter, filtering the binary pixels with the asymmetric digital filter generating a weighted sum of the pixels; producing a multi-level pixel from the weighted sum; comparing the multi-level pixel to a preset level and generating a binary pixel output; collecting the binary pixel output and forming an adjusted halftone binary bitmap file; and exposing a printing plate to the adjusted halftone binary bitmap file.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 15 is another embodiment of the invention using a lookup table.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
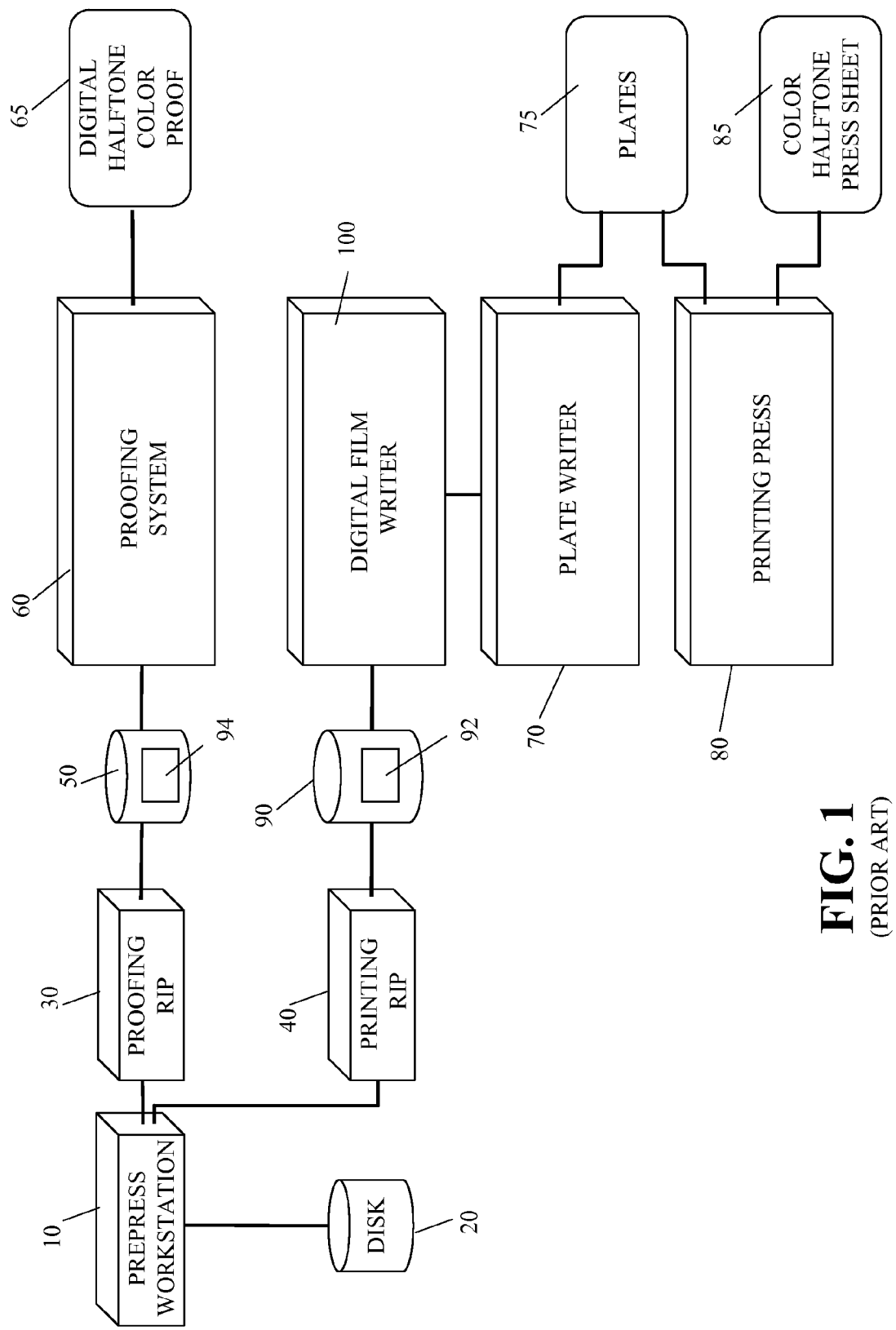
FIG. 1 is a block diagram showing the conventional workflow for digital halftone file processing.

Referring to FIG. 1, there is shown a prepress workstation 10, with customer artwork stored on disk 20. The customer may store images, text and line-work on disk 20. The customer may use a program such as Quark's QuarkXPress to combine the images, text, and line-work into a job consisting of one or more pages. The QuarkXPress Program running on the prepress workstation 10 may output the job as a postscript or portable document format (PDF), file to either the RIP for proofing 30, or the RIP for printing 40. Each RIP may consist of a software RIP running on a PC such as Harlequin "ScriptWorks" by Global Graphics Software LTD.

Proofing RIP 30 has a postscript text file, which specifies the dot-gain adjustment for proofing to be applied to all of the continuous tone images within the customer job. This file contains the input and output percent dot relationships for all the colors in the job. The procedure to create this lookup table is described in U.S. Pat. Nos. 5,255,085 and 5,293,539 and implemented in Kodak software, "Dot-gain Manager," which is available in Kodak Approval Digital Halftone Proofers. The RIP will convert CMYK continuous tone images through the dot-gain lookup table. Then the RIP will convert the continuous tone image into a halftone binary bitmap file 94 at the writing resolution of the proofing system 60. The halftone bitmap file 94 may be sent directly from proofing RIP 30 to proofing system 60 or they may be temporarily stored on proofing system disk 50. The proofing system outputs a digital halftone color proof 65.

Printing RIP 40 will have a similar postscript text file that specifies the dot-gain adjustment for press to be applied to all of the continuous tone images within the customer job. The dot-gain curve on printing RIP 40 may be used to linearize the plate such that a 50% input creates 50% dot area coverage on plate. The 50% dot area coverage on the plate then produces a press-sheet on press with additional gain. The plate writer 70 may have an intrinsic gain associated with it, which is compensated for in the same dot-gain curve in printing RIP 40. The printing RIP 40 will convert CMYK continuous tone images through the dot-gain lookup table. Then the printing RIP 40 will convert the continuous tone image into a halftone binary bitmap file 92 at the writing resolution of the digital film writer 100 or the plate writer 70. The plate writing system 70 may be positive or negative writing, such that areas exposed on plate may accept or reject ink on press. The positive or negative sense of the plate writer will typically require negative or positive dot-gain adjustment to create a linear plate. Typically plate writers have a loss or gain of 1% to 3%.

Halftone binary bitmap file 94 has dot gain for proofing system 60 and is different from halftone binary bitmap file 92 which has a dot gain for a plate writer 70.

The plate writing system 70 may be co-located in the printing press 80. In this case the press contains additional capability of being able to image the printing plates 75 which are already mounted on the press.

A digital film writer 100 may precede the plate writing system. The halftone binary bitmap files 92 used to make the film or plate may be stored temporarily on disk 90 prior to making the film or plate. If a digital film writer is used then the films may be used to make the plate by making an optical contact exposure. This is a well known process in the art. The additional dot-gain or dot loss due to the contact exposure and processing of the plate may be compensated for in the dot-gain curves used to make the film.

It is understood that there may also be iterative steps of making film and plates with the end result of a plate being mounted in the press used to create a press-sheet with the customer artwork. The dot-gain curve used in RIP 40 may contain compensation for all of the steps used to create the plate. In addition the dot-gain curve in RIP 40 may also contain compensation for a given press to achieve a desired target.

The plate writing system 70 outputs a set of digital plates 75 used in the printing press 80 to create color halftone press-sheets 85. Note that the invention may also be used in black and white, single, or multiple color systems and is not limited to process color, cyan, magenta, yellow, and black, printing systems.

Figure 2:
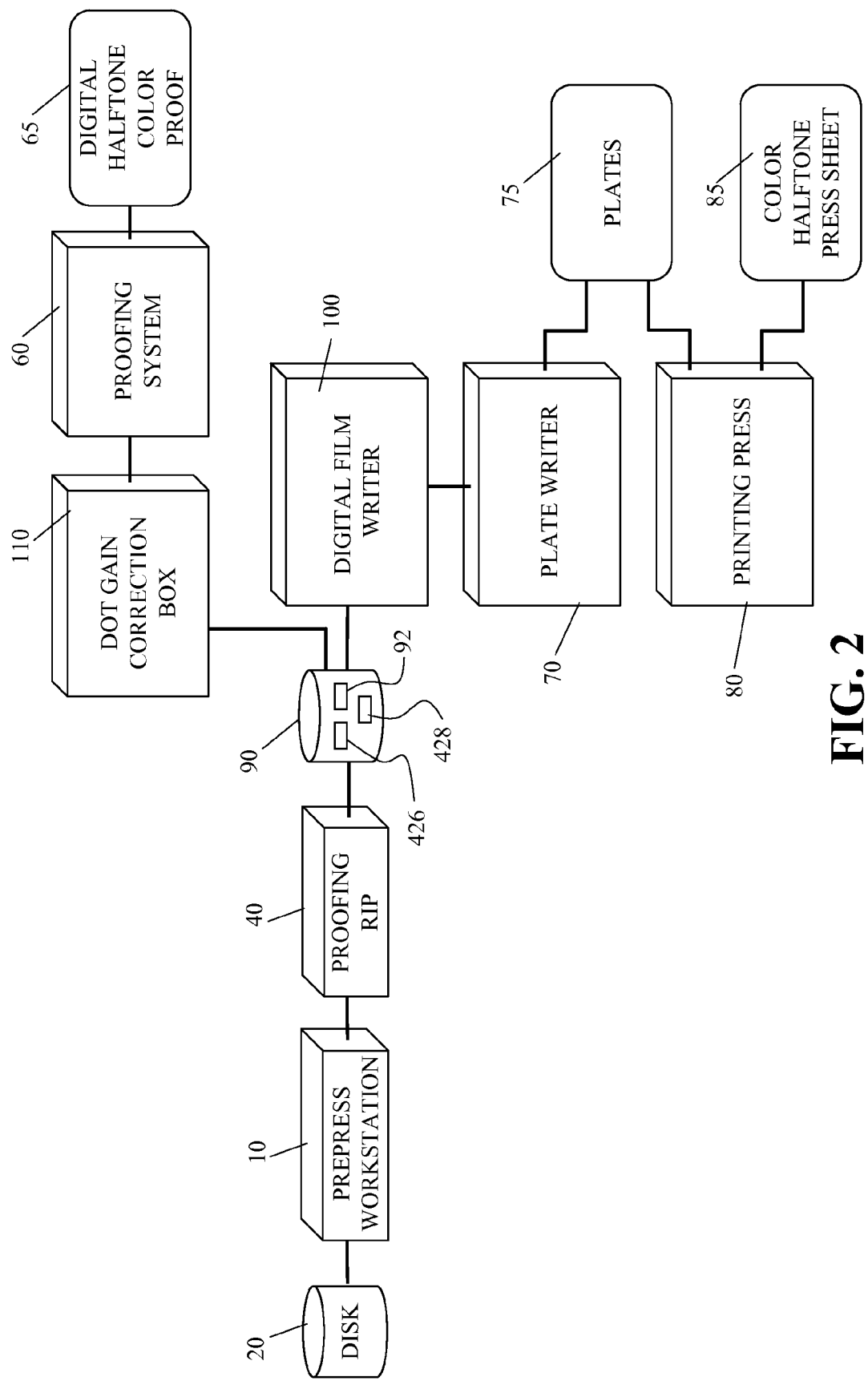
FIG. 2 is a block diagram showing the method of the present invention for adding dot-gain to a digital halftone file to make a proof.

Referring now to the prior art shown in FIG. 2, customer artwork is stored on disk 20. The customer may store images, text and, line-work on disk 20. The customer may use a program such as Quark's QuarkXPress to combine the images, text, and line-work into a job consisting of one or more pages. The QuarkXPress Program running on the prepress workstation 10 may output the job as a postscript or portable document format (PDF), file to the RIP for printing 40 and/or proofing 30. The RIP may consist of a software RIP running on a PC such as Harlequin "ScriptWorks" by Global Graphics Software LTD.

The printing RIP 40 will convert the customer artwork into halftone binary bitmap files 92 which may be stored on disk 90 on their way to plate writer 70. The binary data will be screened at a screen ruling 426 and screen angle 428. This information may also be stored on disk 90.

Printing RIP 40 will have a postscript text file which will specify the dot-gain adjustment for press to apply to all of the continuous tone images within the customer job. The dot-gain curve on printing RIP 40 may be used to linearize the plate such that a 50% input creates 50% dot area coverage on plate. The 50% dot area coverage on the plate then produces a press-sheet on press with additional gain. The plate writer 70 may have an intrinsic gain associated with it, which is compensated for in the dot-gain curve in printing RIP 40. The plate writing system 70 may be positive or negative writing, such that areas exposed on plate may accept or reject ink on press. The positive or negative sense of the plate writer will typically require negative or positive dot-gain adjustment to create a linear plate. Typically plate writers have a loss or gain of 1% to 3%.

The plate writing system 70 may be co-located in the printing press 80. In this case the press contains additional capability of being able to image the printing plates which are already mounted on the press.

A digital film writer 100 may precede the plate writing system. The halftone binary bitmap files 92 used to make the film or plate may be stored temporarily on disk 90 prior to making the film or plate. If a digital film writer is used then the films may be used to make the plate by making an optical contact exposure. This is a well known process in the art. The additional dot-gain or dot loss due to the contact exposure and processing of the plate may be compensated for in the dot-gain curves used to make the film.

It is understood that there may also be iterative steps of making film and plates with the end result of a plate being mounted in the press used to create a press-sheet with the customer artwork. The dot-gain curve used in printing RIP 40 may contain compensation for all of the steps used to create the plate. In addition the dot-gain curve in printing RIP 40 may also contain compensation for a given press to achieve a desired target.

The plate writing system 70 outputs a set of printing plates 75 used in the printing press 80 to create color halftone press-sheets 85.

The halftone binary bitmap files 92 stored or copied to disk 90 may also be sent using dot-gain correction box 110 to the proofing system 60. In this case the dot-gain correction box 110 would be programmed to unbuild the dot-gain curves used to make the plates and add the dot-gain correction required to allow the proofing system 60 to match the target. The unbuild and dot-gain correction is performed in one step using a single combined curve.

To obtain the dot-gain curve used in the dot-gain on bitmap calculation the customer runs a test proof through the printing RIP 40 to make plates 75 and a color halftone press-sheet 85 on printing press 80. The press-sheet 85 made with the test proof is measured and becomes the target press-sheet values. The bitmaps made for the test proof are stored in disk 90. These same bitmaps are passed directly to the proofing system 60 bypassing the dot-gain correction box for proofing 110. The resulting proof is called the benchmark proof 65. The benchmark proof is measured and compared to the target press-sheet values. The dot-gain adjustment required to add to the percent dot into the dot-gain correction box for proofing 110 are calculated by finding or calculating the input value resulting in an output value on the benchmark proof required to achieve the output value on the target press-sheet.

The halftone binary bitmap file 92 is in the most preferred embodiment generated by a raster image processor for printing 40, shown in FIG. 2. Alternatively, the halftone binary bitmap file can be generated from a high resolution scan of a halftone film. The scanned image is clipped using a threshold to create a binary bitmap at the writing resolution of the plate writer 70. The image on disk is processed by dot-grain correction box for proofing 110 on the way to proofing system 60 creating digital halftone color proof 65. Alternately a digital film writer 100 and plate processor maybe used to create plates 75. The dot-gain correction box for proofing 110 used in the present invention would be adjusted according to which method was used to create the printing plates.

The method contemplates that the halftone binary bitmap file 92 is at a resolution of between 600 dpi and 6000 dpi, and more preferably at a resolution of between 1800 dpi and 3000 dpi.

Figure 3:
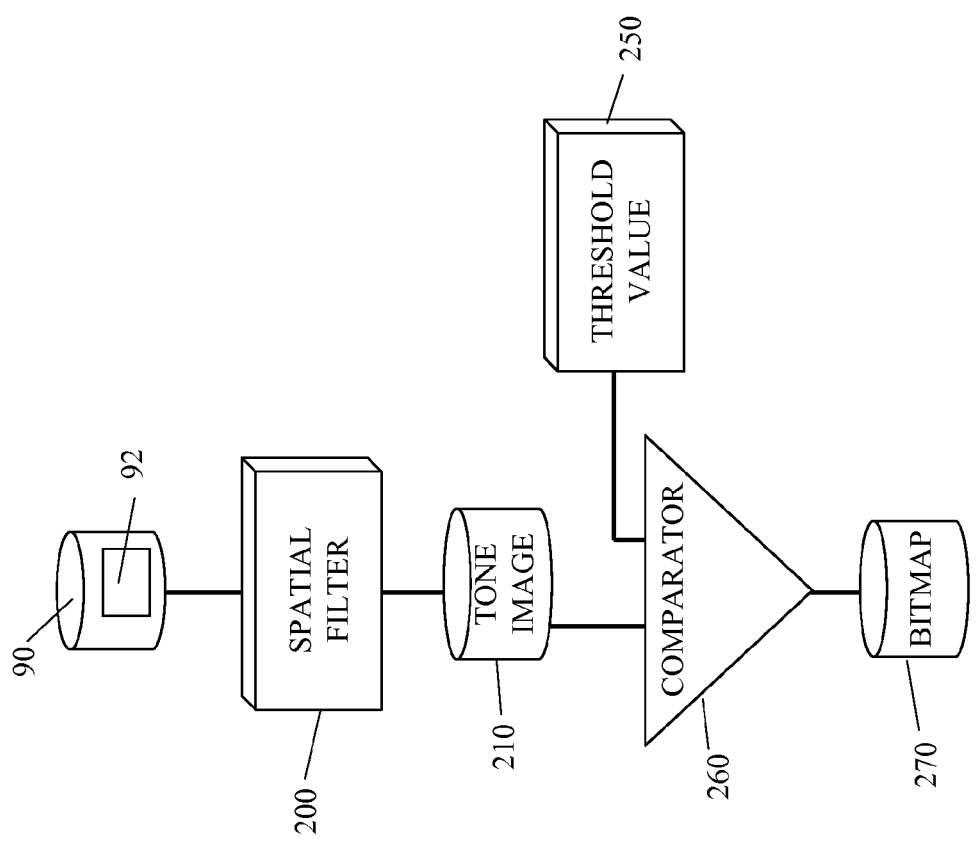
FIG. 3 is a flow diagram showing the processing steps for adding dot-gain compensation to a rasterized halftone digital image file.
Figure 5:
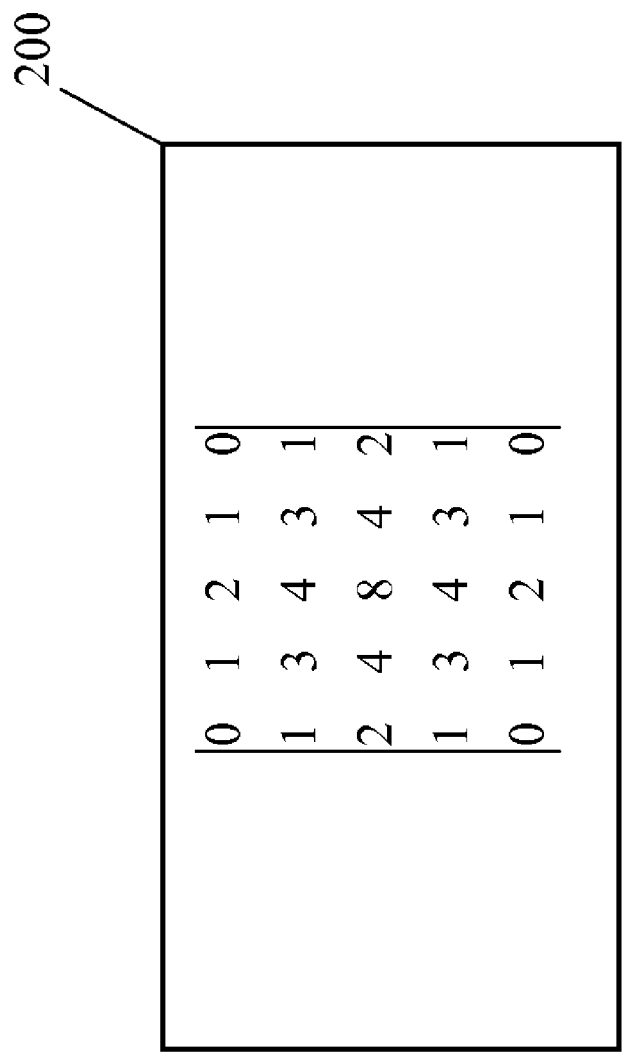
FIG. 5 shows a prior art spatial filter.
Figure 10:
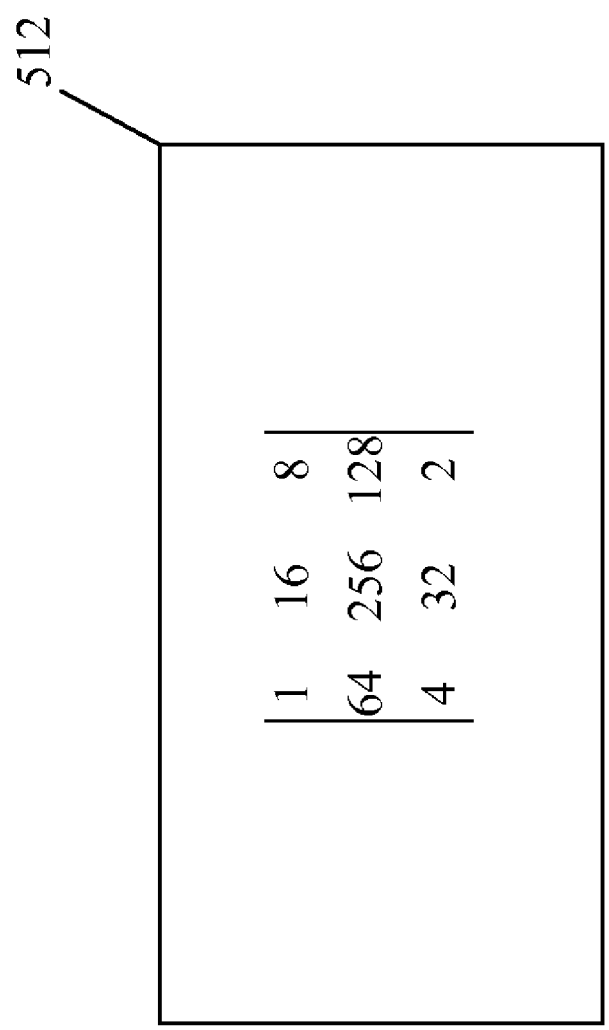
FIG. 10 is an embodiment of an asymmetric filter.

FIG. 3 shows prior art of a halftone binary bitmap file 92 on plate writing system disk 90 convolved through a spatial filter 200 to create a blurred continuous tone filtered image 210. For each pixel the level of the blurred filtered image 210 is compared to the threshold value 250 in comparator 260. The output of the comparator 260 is the dot-gain adjusted halftone binary bitmap 270. This bitmap 270 is then sent to the proofing system 60. The prior art shows FIG. 5 is used for the spatial filter 200. The present invention replaces the filter of FIG. 5 with an asymmetric filter as shown in FIG. 10.

Figure 4:
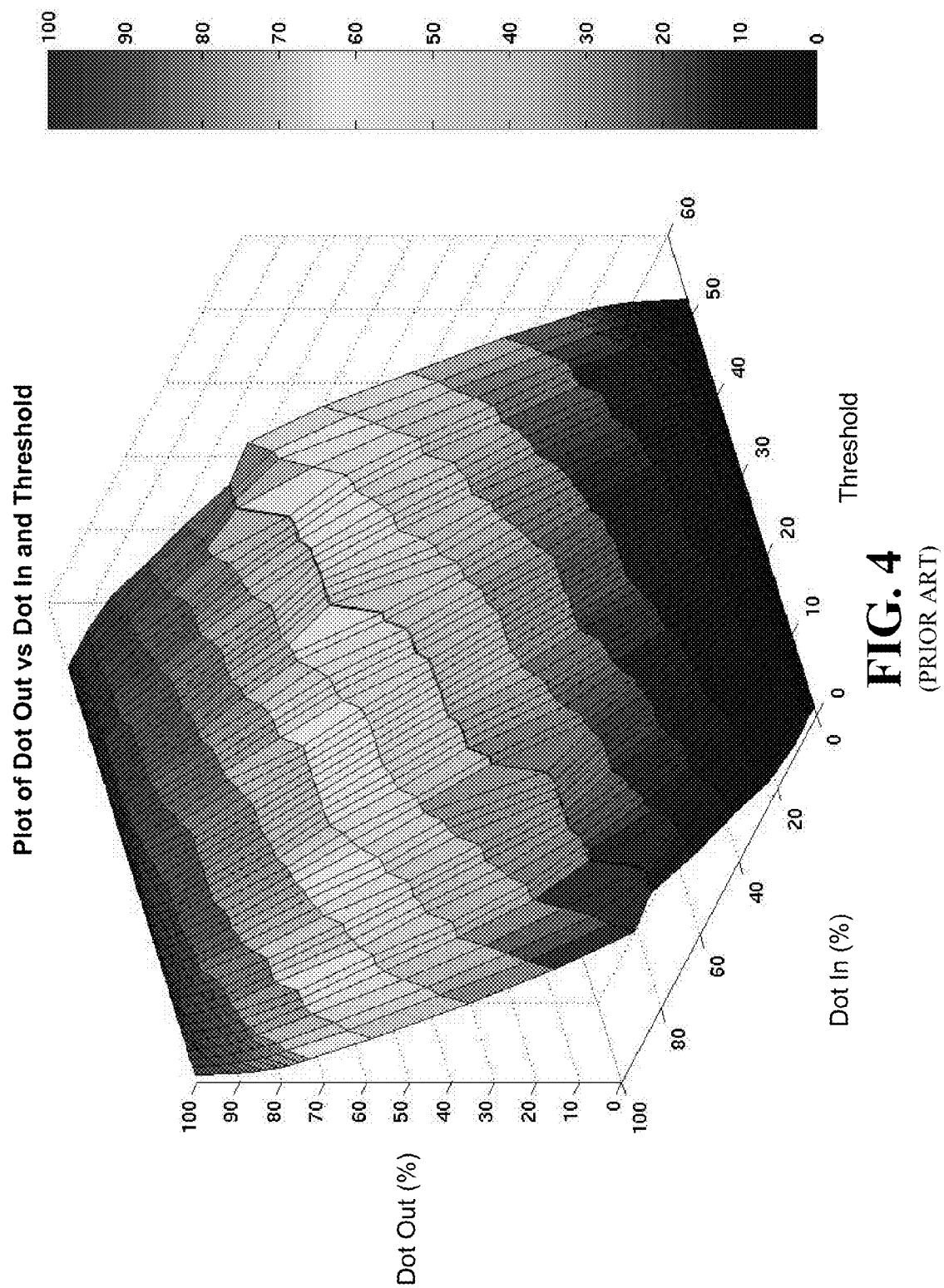
FIG. 4 contains a graph of percent dot out verses percent dot in by threshold value for the dot-gain method described.

FIG. 4 is a plot of the calculated percent dot out verses percent dot in and threshold level, using a tint scale screened at 150 lines per inch at 45 degrees for writing at 2540 dot per inch, processed through the filter shown in FIG. 5. Increasing the threshold level results in an increase in the dot-gain for a given percent dot input, while decreasing the threshold level results in a decrease in dot-gain for a given percent dot input.

A single bit in a 2540 dot per inch, 100 micro-pixels per mm, bitmap file represents an area of 100 um$^2$. In a 150 line screen halftone, 6 lines per mm., this represents a 0.34% dot change allowing us to faithfully reproduce a given dot-gain target by adding or subtracting micro-pixels within the bitmap file.

Figure 6C:
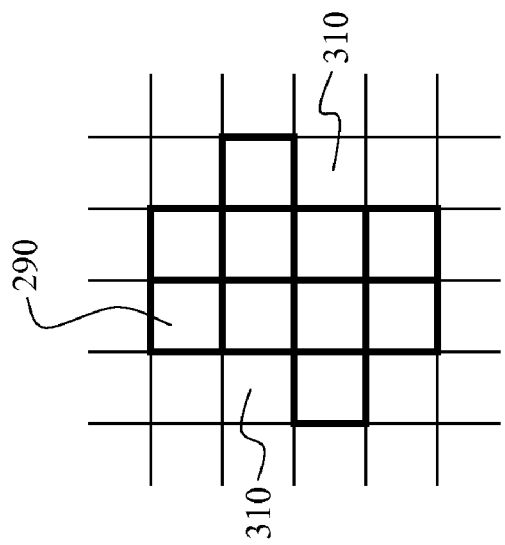
FIG. 6c shows an output bitmap with dot loss.
Figure 6B:
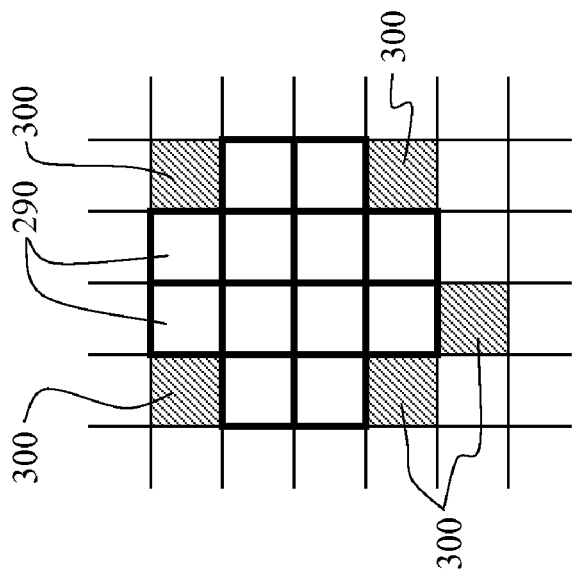
FIG. 6b shows an output bitmap with gain.
Figure 6A:
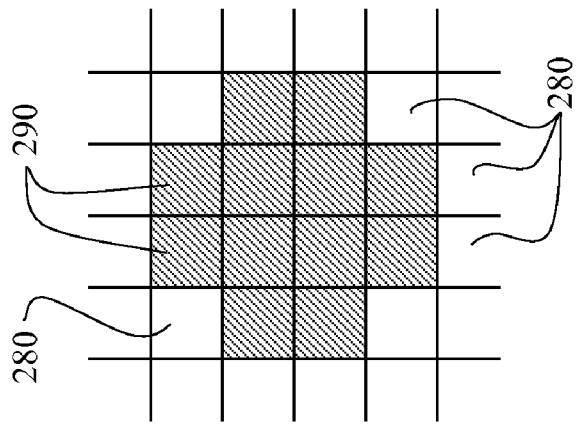
FIG. 6a shows an input bitmap.

FIGS. 6a, 6b, and 6c, are an example showing how the bitmaps might be modified using this invention. FIG. 6a shows an input dot with 12 micro-pixels on, 290. Off micro-pixels are shown as 280. At 2540 dpi writing resolution and 150 dpi halftone screen a halftone dot feature with 12 micro-pixels represents a 4.3% halftone dot. FIG. 6b shows an addition of 5 micro-pixels 300, for an output halftone dot consisting of a total of 17 micro-pixels or approximately 6.12%. FIG. 6c shows a subtraction of 2 micro-pixels 310, for a dot loss of 0.7%. The prior art shows that the spatial filter blurs the incoming bitmap, while the threshold and compare operation defines a new outline of the existing halftone dot. This preserves the halftone dot in the output bitmap while adjusting the apparent tonescale of the output image. The present invention uses an asymmetric filter for the spatial filter 200 thereby increasing the number of distinct levels in the blurred continuous tone filtered image 210, such that there are more threshold values 250 that will have an affect on the number of on and off pixels in the dot-gain adjusted halftone bitmap 270.

Figure 7:
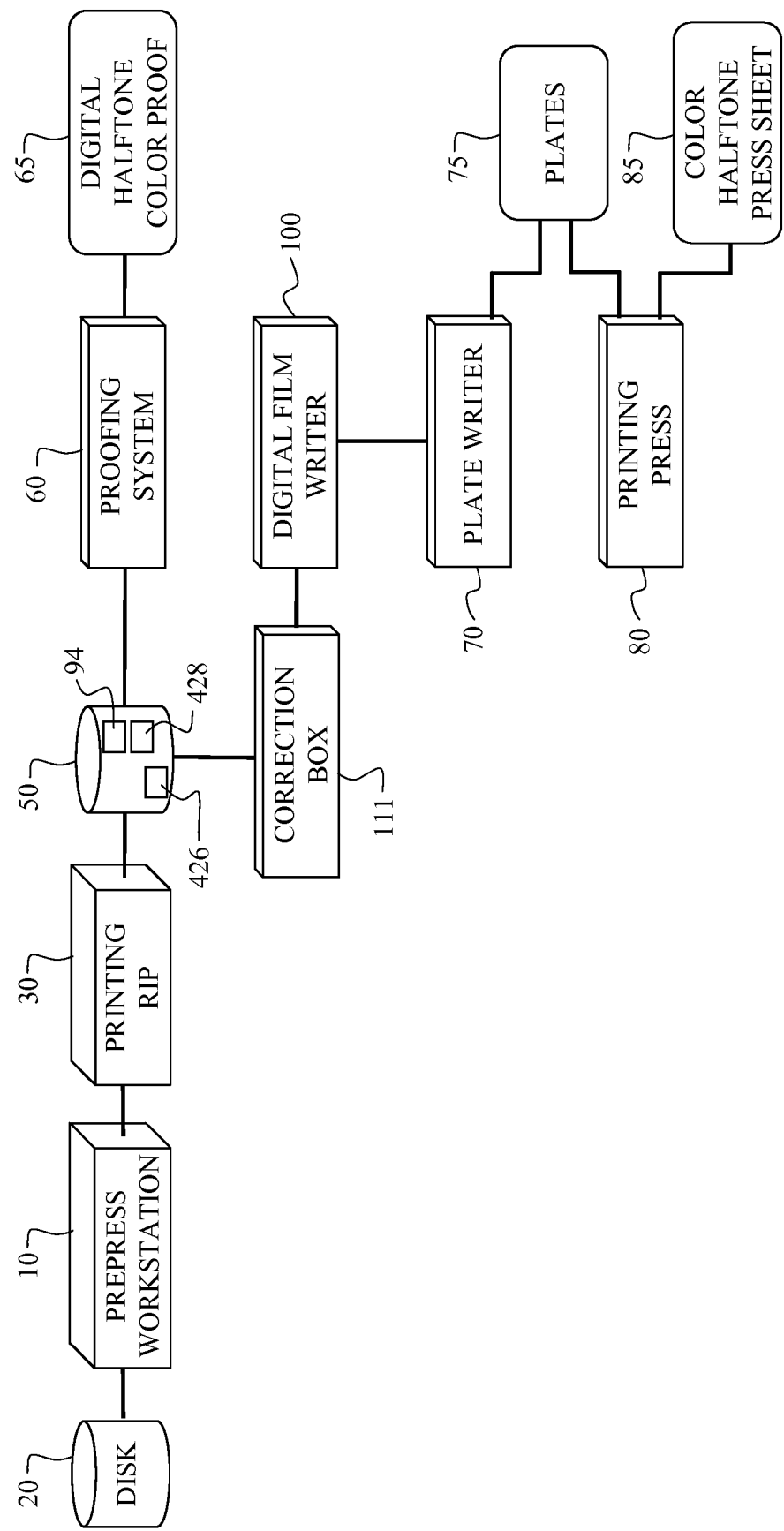
FIG. 7 is a block diagram showing the prior art for adding dot-gain to the digital halftone files used to make the printing plates.

Referring now to FIG. 7 we show another example of the prior art. The customer artwork is stored on disk 20. The customer may store images, text, and line-work on disk 20. The customer may use a program such as Quark's QuarkXPress to combine the images, text, and line-work into a job consisting of one or more pages. The QuarkXPress Program running on the prepress workstation 10 may output the job as a postscript or portable document format (PDF), file to the RIP for proofing 30 and printing 40. The RIP may consist of a software RIP running on a PC such as Harlequin "ScriptWorks" by Global Graphics Software LTD. RIP 30 will have a postscript text file which will specify the dot-gain adjustment for proofing to apply to all of the continuous tone images within the customer job. The dot-gain curve on RIP 30 may be used to match a known standard such as the Committee for Graphic Arts Technical Standardization (CGATS) Technical Report 001 (TR001).

The proofing RIP 30 will convert the customer artwork into halftone binary bitmap files 94, which may be stored on proofing system disk 50 on their way to the proofing system 60. The binary data will be screened at a screen ruling 426 and screen angle 428. This information may also be stored on proofing system disk 50.

Proofing RIP 30 will output cyan, magenta, yellow, and black bitmaps to disk 50 on their way to proofing system 60 to create digital halftone color proof 65. The bitmaps for proofing may also be used with dot-gain correction box for printing 111 to create printing plates 75. Dot-gain correction box for printing 111 will be programmed to unbuild the dot-gain correction for proofing and build in the dot-gain correction required such that the color halftone press-sheet 85 matches the digital halftone color proof 65. The present invention utilizes an asymmetric filter within dot-gain correction box for printing 111.

The plate writer 70 may be co-located in the printing press 80. In this case the press contains additional capability of being able to image the printing plates which are already mounted on the press.

A digital film writer 100 may precede the plate writing system. The dot-gain correction box for printing 111 would then be programmed to take into account the additional gain or loss required due to the digital film writer, 100, and the contact process of making the plates 75.

It is understood that there may also be iterative steps of making film and plates with the end result of a plate being mounted in the press used to create a press-sheet with the customer artwork. The dot-gain curve used in the dot-gain correction box for printing 111 may contain compensation for all of the steps used to create the plate. In addition the dot-gain curve may also contain compensation for a given press to achieve a desired target.

To obtain the dot-gain curve used in the dot-gain on bitmap calculation the customer runs a test proof through the proofing RIP 30 to make plates 75 and a color halftone press-sheet 85 on printing press 80. The press-sheet 85 made with the test proof is measured and becomes the benchmark press-sheet values. The bitmaps made for the test proof are stored in disk 50. These same bitmaps are passed directly to the proofing system 60. The resulting proof is called the digital halftone color proof 65. The benchmark proof is measured and compared to the target proof values. The dot-gain adjustment required to add or subtract to the percent dot into the dot-gain correction box for printing 111 are calculated by finding or calculating the input value resulting in an output value on the benchmark proof required to achieve the output value on the target proof.

Figure 8:
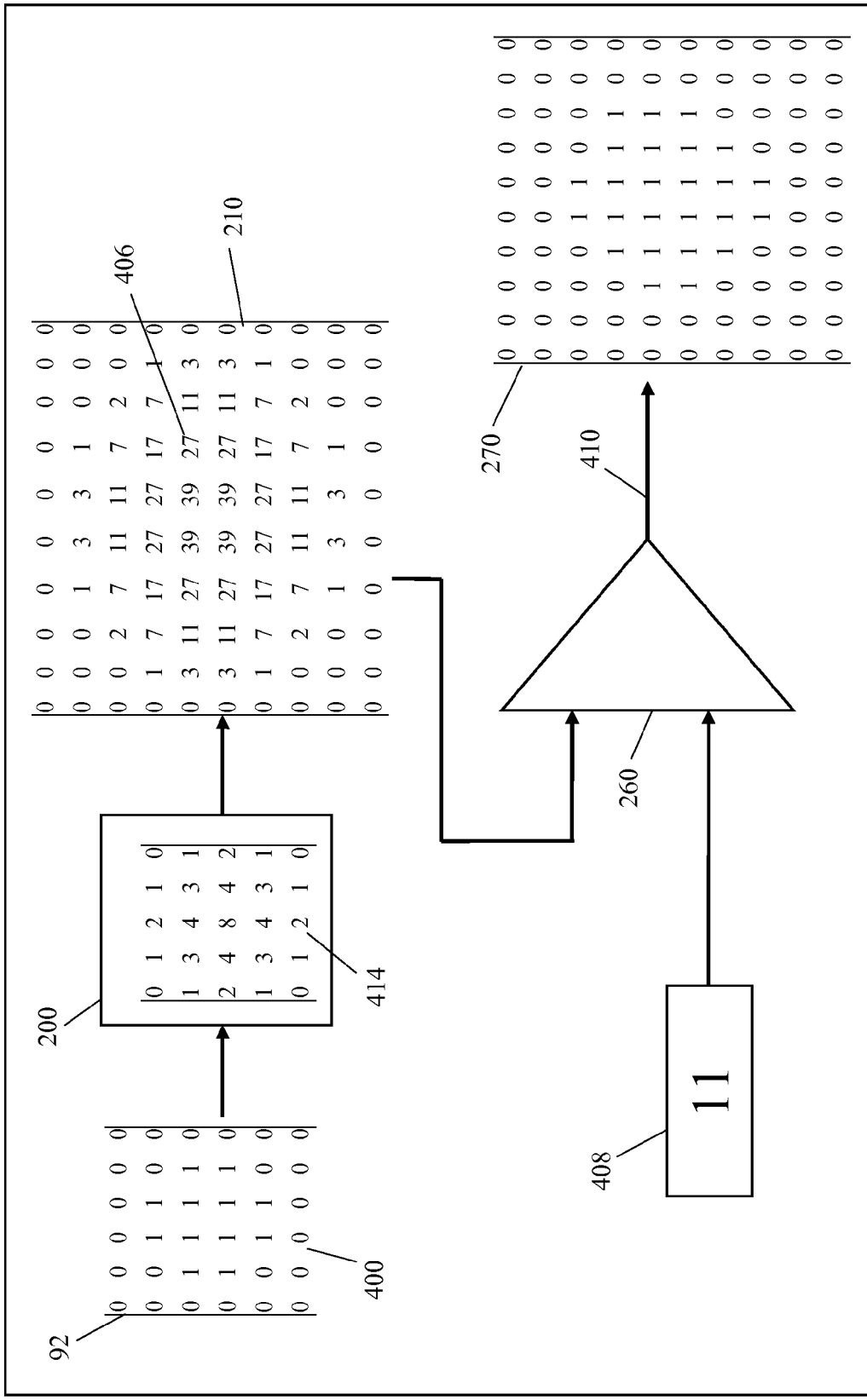
FIG. 8 is a prior art block diagram showing a symmetric low pass filter.

Referring now to FIG. 8, the prior art method for adjusting dot-gain for a halftone binary bitmap file is depicted using a digital filter, namely a low pass filter 414. The first step involves inputting a halftone binary bitmap file 92 consisting of binary pixels 400 to a spatial filter 200, shown here as a low pass blur filter 414. The filter may be implemented by passing each pixel through delay elements, multiplying each delayed position by the weight of the filter, and computing a weighted sum for each pixel location to produce a filtered image 210 composed of multi-level pixels 406.

In FIG. 8 Each multi-level pixel 406 is compared to a preset level 408 using comparator 260 and a binary pixel output 410 is generated. The binary pixel outputs are collected to form a dot-gain adjusted halftone binary bitmap file 270. In the example in FIG. 8 the preset level is set to eleven.

The spatial filter 200 of the prior art can be a low pass filter 414, an edge enhancement filter, an averager filter, a high pass filter, a band pass filter, or an edge enhancement filter.

The preset threshold level 408 mentioned above in this method can be determined by the color separation that the halftone binary bitmap file represents.

To use the method of the invention, the halftone binary bitmap file may be processed at a halftone binary bitmap screen ruling 426 and a halftone binary bitmap screen angle 428, or it can be determined by a halftone binary bitmap screen ruling alone, or by a halftone bitmap screen angle independently of the screen ruling.

Figure 9:
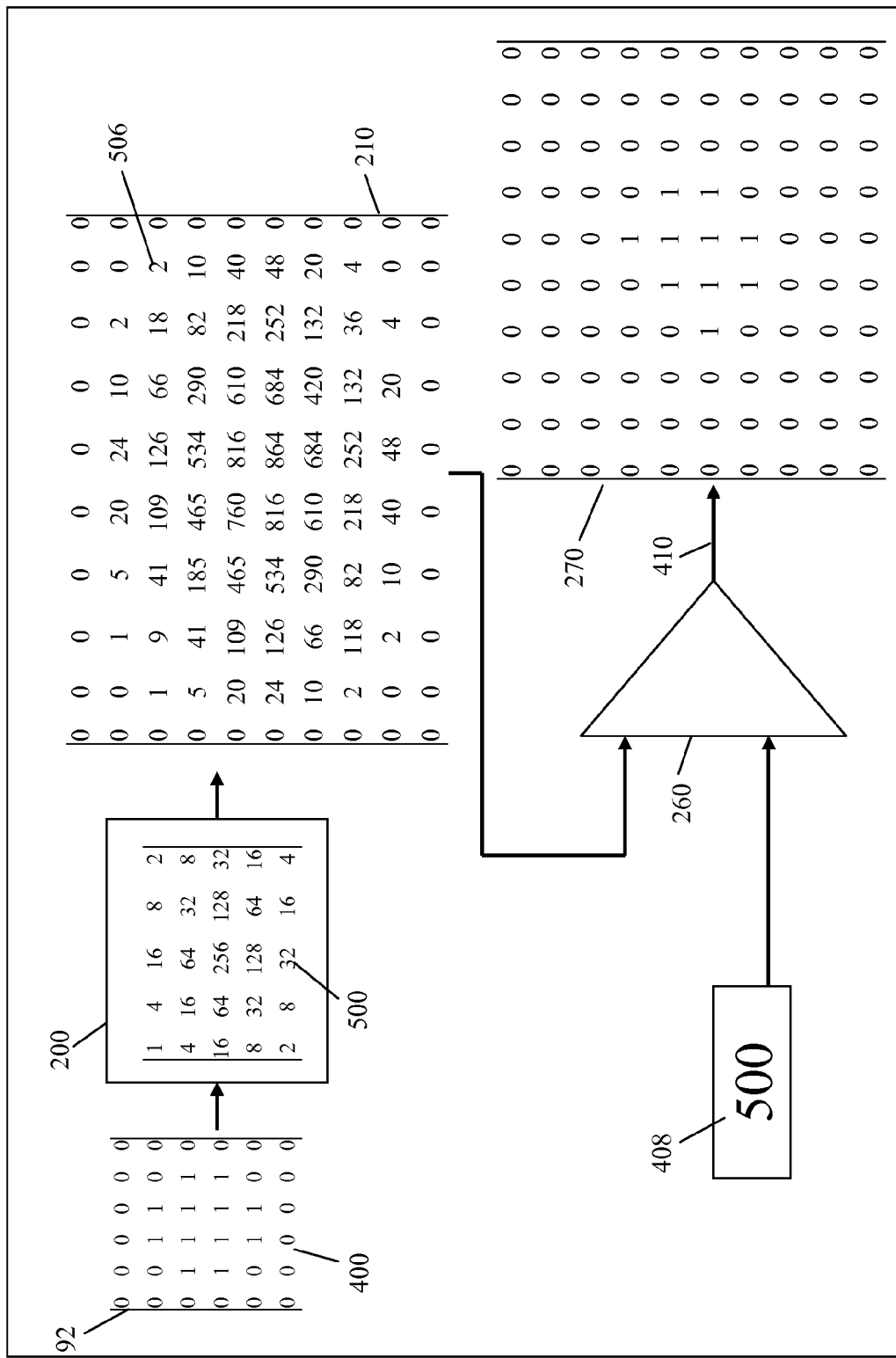
FIG. 9 is a block diagram showing the method of the present invention using an asymmetric filter.

In FIG. 9 shows a preferred embodiment of the present invention. FIG. 9 shows that the first step involves inputting a halftone binary bitmap file 92 consisting of binary pixels 400 to a spatial filter 200 shown here as an asymmetric digital filter 500. The filter may be implemented by passing each pixel through delay elements, multiplying each delayed position by the weight of the filter, and computing a weighted sum for each pixel location to produce a filtered image 210 composed of multi-level pixels 506. The asymmetric filter 500, results in more output states, multi-level pixels 506, in the filtered image 210 than the low pass filter 414 shown in FIG. 8.

FIG. 9 shows a filter that is asymmetric in X and Y directions. However, careful examination will show that it appears to be symmetric in a diagonal direction. An asymmetric filter 512 shown in FIG. 10 is asymmetric in all directions. The asymmetric filter results in more distinct output levels 506.

One skilled in the art will also recognize that asymmetric filters larger than the 3×3 element filter shown in FIG. 10 may be created. One skilled in the art will recognize that an asymmetric filter may be smaller than size 3 elements by 3 elements.

Asymmetric filter 500 is one example symmetric in X and Y directions, or Horizontal and Vertical directions. Asymmetric filter 500 may be asymmetric within a direction such as X or Y or both. Asymmetric filter 500 may also be asymmetric in X relative to Y. The ideal implementation of an asymmetric filter is shown in FIG. 10, 512. Asymmetric filter 512 is asymmetric in X, asymmetric in Y, and asymmetric in X relative to Y resulting in the maximum amount of output states when convolved against an input image.

Figure 11:
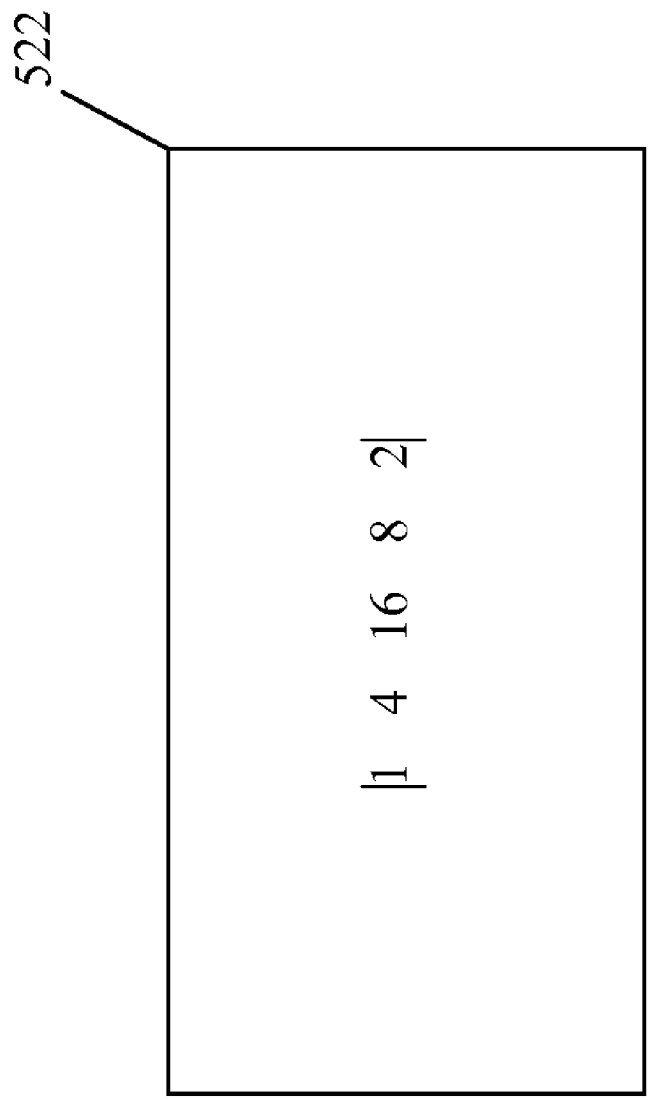
FIG. 11 is an embodiment of a one-dimensional horizontal asymmetric filter.
Figure 12:
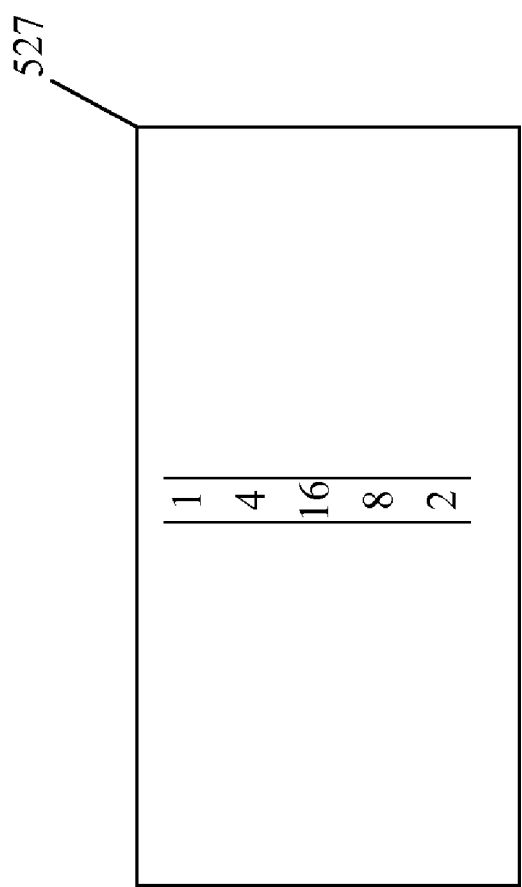
FIG. 12 is an embodiment of a one-dimensional vertical asymmetric filter.

FIG. 11 shows an asymmetric filter in one X direction 522. FIG. 12 shows an asymmetric filter in another Y direction 527. The invention may be implemented as a combination of one or more filtering steps with one or more of the steps utilizing an asymmetric filter. It is well known in the art that a two dimensional filtering operation may be composed of two one-dimensional processing steps.

Figure 13:
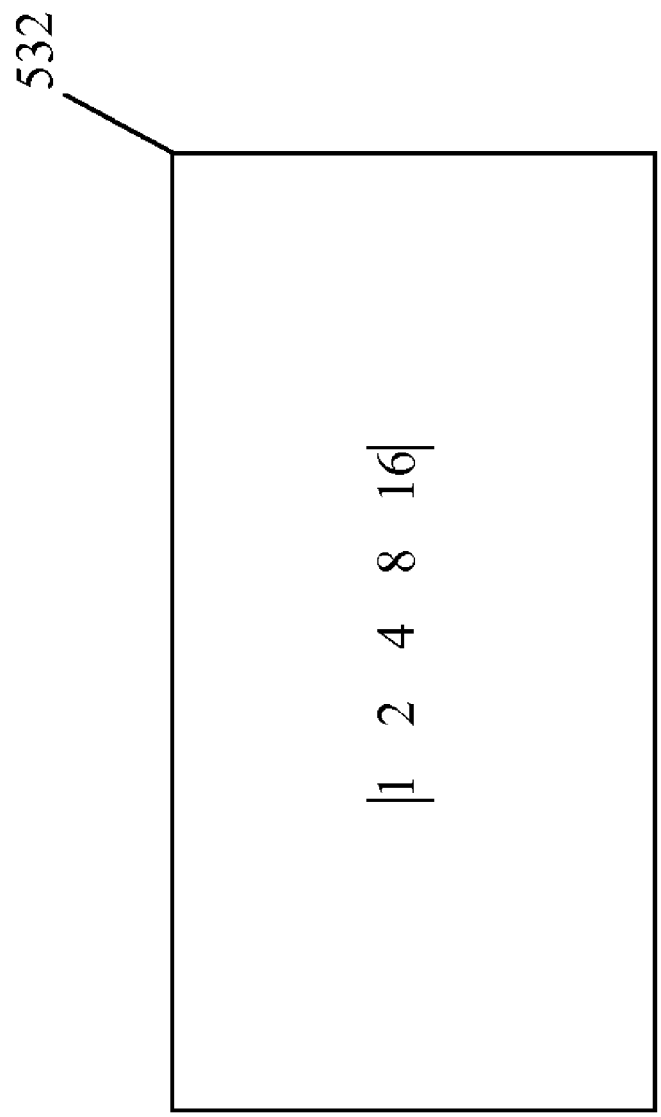
FIG. 13 is an embodiment of a one-dimensional asymmetric filter with increasing coefficients.

FIG. 13 is another embodiment of an asymmetric filter 532 showing a different distribution of the weight of each of the coefficients in the filter 532.

The X direction asymmetric filter 522, contains five coefficients with binary weightings of 1, 2, 4, 8, and 16. Possible output states of this digital filter convolved with five binary input pixels having levels of 0 and 1 are the integers 0 through 31. A filter of size N with unique binary encodings for each coefficient has $2^N$ possible outputs.

Similarly a filter of size M, with unique binary encodings for each coefficient has $2^M$ possible outputs. A two dimensional filter of size N×M with unique coefficients in both X and Y directions has $2^{(M+N)}$ possible outputs. One skilled in the art will recognize that the invention has the most possible outcomes and the least amount of image quantization error when it is implemented with an asymmetric filter in two dimensions with unique binary encoded coefficients.

Figure 14:
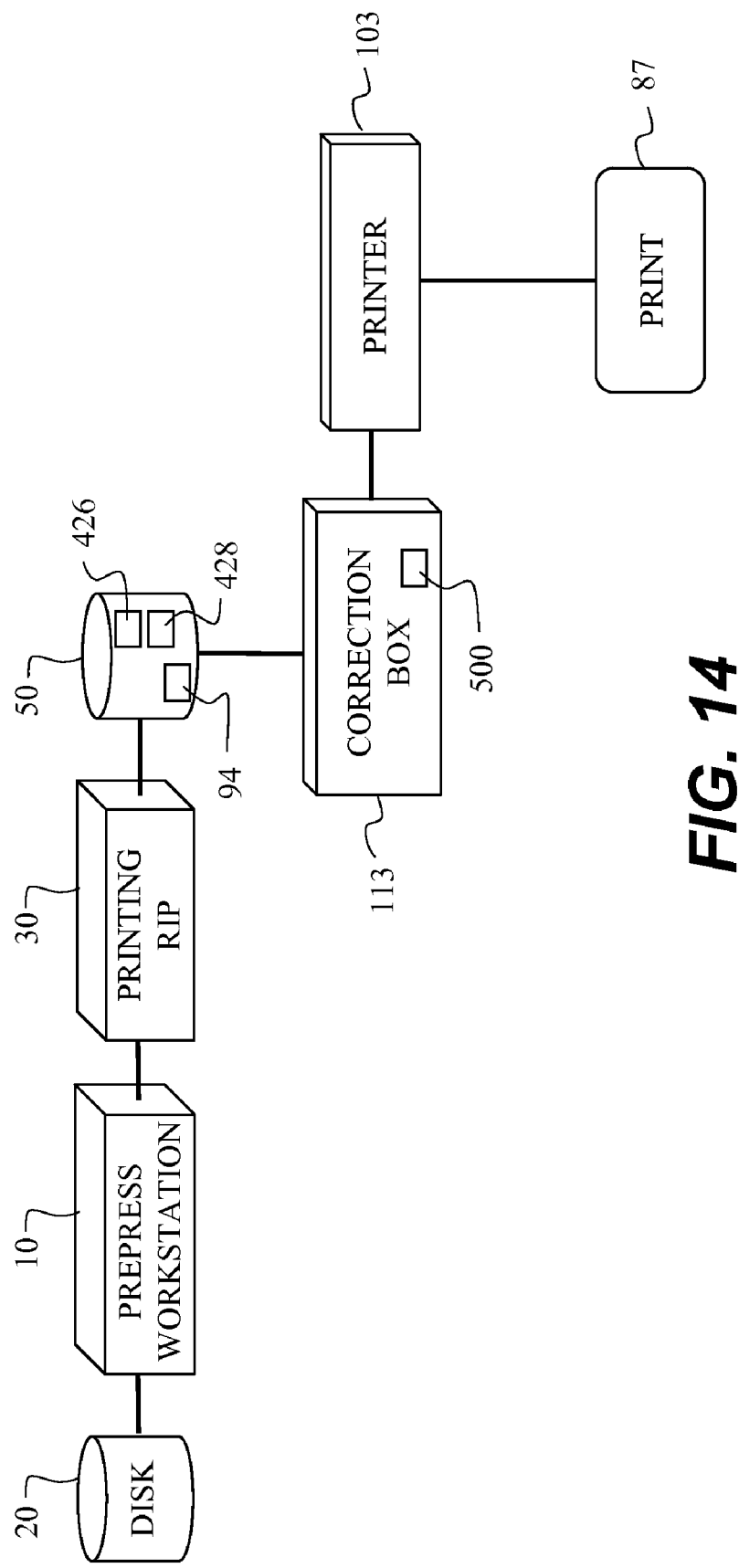
FIG. 14 is a block diagram showing the method of the present invention with an asymmetric filter used to make a print.

Referring now to FIG. 14 an implementation of the present invention is shown. The customer artwork is stored on disk 20. The customer may store images, text and, line-work on disk 20. The customer may use a program such as Quark's QuarkXPress to combine the images, text, and line-work into a job consisting of one or more pages. The QuarkXPress Program running on the prepress workstation 10 may output the job as a postscript or portable document format (PDF), file to the RIP for proofing 30 and printing 40. The RIP may consist of a software RIP running on a PC such as Harlequin "ScriptWorks" by Global Graphics Software LTD. Proofing RIP 30 will have a postscript text file which will specify the dot-gain adjustment for proofing to apply to all of the continuous tone images within the customer job. The dot-gain curve on proofing RIP 30 may be used to match a known standard such as the Committee for Graphic Arts Technical Standardization (CGATS) Technical Report 001 (TR001). The dot-gain curve on RIP 30 may be used to adjust the dot-gain going to a printing press via a plate. The dot-gain curve on RIP 30 may be used to adjust the dot-gain going to a first proofing device not shown.

The proofing RIP 30 will convert the customer artwork into binary halftone files, which may be stored on proofing system disk 50 on their way to some first printing device not shown. First printing device may be another proofer, a plate writer, or a film writer. Binary halftone bitmap files 94 stored on proofing system disk 50 have dot-gain for first printing device. To proof these binary halftone files on a printer 103, the binary halftone bitmap files 94 are run through the present invention utilizing asymmetric digital filters 500 in dot-gain correction box with asymmetric filter 113 on their way to a second printer 103. The binary data will be screened at a screen ruling 426 and screen angle 428. This information may also be stored on proofing system disk 50. Print 87 is shown schematically.

The second printer 103 may be a color printer. The second printer 103 may be an inkjet printer. The second printer 103 may be a plate writer and press system.

Another embodiment of the invention is shown in FIG. 15. The comparator function is implemented as a lookup table 262. In FIG. 15 input halftone binary bitmap file 92 consisting of binary pixels 400 are filtered through digital filter 200 with asymmetric digital filter coefficients 500 resulting in multi-level pixels 506 in filtered image 210. Multi-level pixels 506 are then passed through lookup table 262. Lookup table 262 uses multi-level pixels as an address column 264 and binary output data column 266 corresponding to the address as binary pixel output 410. The binary pixel outputs for each multi-level pixel are collected and result in the dot-gain adjusted halftone binary bitmap file 270. In this example the lookup table 262 contains an address column 264 with corresponding binary output data column 266. Address column 264 shows multi-level pixels input with levels of 0 to 499 are output as binary 0's, while multi-level pixels input with levels of 501 to 1023 are output as binary 1's. The invention has been described in detail with particular reference to certain preferred embodiments thereof, but it will be understood that variations and modifications can be effected within the scope of the invention.

PARTS LIST 10 prepress workstation
20 disk with customer artwork
30 raster image processor (RIP) for proofing
40 raster image processor (RIP) for printing
50 proofing system disk
60 proofing system
65 digital halftone color proof (benchmark proof)
70 plate writer
75 plates
60 printing press
85 color halftone press-sheet
87 print
90 plate writing system disk
92 halftone binary bitmap file
94 halftone binary bitmap file
100 digital film writer
103 printer
110 dot-gain correction box for proofing
111 dot-gain correction box for printing
113 dot-gain correction box with asymmetric filter
200 spatial filter
210 filtered image
250 threshold value
260 comparator
262 lookup table
264 address column
266 binary output data column
270 adjusted halftone binary bitmap file
280 off micro-pixel
290 on micro-pixel
300 additional micro-pixel to add dot-gain
310 deleted micro-pixel to subtract dot-gain
400 binary pixels
406 multi-level pixel
408 preset level
410 binary pixel output
414 low pass filter
426 screen ruling
428 screen angle
500 asymmetric filter
506 multi-level pixel
512 asymmetric filter
522 X dimension asymmetric filter
527 Y dimension asymmetric filter
532 asymmetric filter

The invention claimed is:

1. A method for adjusting dot-gain for a halftone binary bitmap file comprising:
    a) inputting a halftone binary bitmap file consisting of binary pixels to an asymmetric digital filter;
    b) filtering the binary pixels with the asymmetric digital filter and generating a multi-level pixels;
    c) comparing the multi-level pixel to a preset level and generating a binary pixel output;
    d) collecting the binary pixel output and forming an adjusted halftone binary bitmap file; and
    wherein the preset level is determined by the color separation that the halftone binary bitmap file represents.

2. The method of claim 1 wherein the halftone binary bitmap file is generated by a raster image processor.

3. The method of claim 1 wherein the halftone binary bitmap file is generated from a high resolution scan of a halftone film.

4. The method of claim 1 wherein the halftone binary bitmap file is at a resolution of between 600 dpi and 6000 dpi.

5. The method of claim 4 wherein the halftone binary bitmap file is at a resolution of between 1800 dpi and 3000 dpi.

6. The method of claim 1 wherein the halftone binary bitmap file has been processed at a halftone binary bitmap screen ruling and a halftone binary bitmap screen angle.

7. The method of claim 1 wherein the asymmetric digital filter is asymmetric in the pixel direction relative to the line direction.

8. The method of claim 1 wherein the asymmetric digital filter is asymmetric in both the pixel direction and the line direction.

9. The method of claim 1 wherein the step of comparing the multi-level pixel to a preset level and generating the binary pixel output is performed using a lookup table.

10. A method for adjusting dot-gain for a halftone binary bitmap file comprising:
    a) inputting a halftone binary bitmap file consisting of binary pixels to an asymmetric digital filter;
    b) filtering the binary pixels with the asymmetric digital filter and generating a multi-level pixels;
    c) comparing the multi-level pixel to a preset level and generating a binary pixel output;
    d) collecting the binary pixel output and forming an adjusted halftone binary bitmap file; and
    wherein the preset level is determined by a halftone binary bitmap screen ruling.

11. A method for adjusting dot-gain for a halftone binary bitmap file comprising:
    a) inputting a halftone binary bitmap file consisting of binary pixels to an asymmetric digital filter;
    b) filtering the binary pixels with the asymmetric digital filter and generating a multi-level pixels;
    c) comparing the multi-level pixel to a preset level and generating a binary pixel output;

d) collecting the binary pixel output and forming an adjusted halftone binary bitmap file; and wherein the preset level is determined by a halftone bitmap screen angle.

12. A method for adjusting dot-gain for a halftone binary bitmap file comprising:
   a) inputting a halftone binary bitmap file consisting of binary pixels to an asymmetric digital filter;
   b) filtering the binary pixels with the asymmetric digital filter and generating a multi-level pixels;
   c) comparing the multi-level pixel to a preset level and generating a binary pixel output;
   d) collecting the binary pixel output and forming an adjusted halftone binary bitmap file;
   e) printing the adjusted halftone binary bitmap file; and
   wherein the preset level is determined by the color separation that the halftone binary bitmap file represents.

13. The method of claim 12 wherein the halftone binary bitmap file is generated by a raster image processor.

14. The method of claim 12 wherein the halftone binary bitmap file is generated from a high resolution scan of a halftone film.

15. The method of claim 12 wherein the halftone binary bitmap file is at a resolution of between 600 dpi and 6000 dpi.

16. The method of claim 12 wherein the halftone binary bitmap file is at a resolution of between 1800 dpi and 3000 dpi.

17. The method of claim 12 wherein the halftone binary bitmap file has been processed at a halftone binary bitmap screen ruling and a halftone binary bitmap screen angle.

18. A method for adjusting dot-gain for a halftone binary bitmap file comprising:
   a) inputting a halftone binary bitmap file consisting of binary pixels to an asymmetric digital filter;
   b) filtering the binary pixels with the asymmetric digital filter and generating a multi-level pixels;
   c) comparing the multi-level pixel to a preset level and generating a binary pixel output;
   d) collecting the binary pixel output and forming an adjusted halftone binary bitmap file
   e) printing the adjusted halftone binary bitmap file; and
   wherein the preset level is determined by a halftone binary bitmap screen ruling.

19. A method for adjusting dot-gain for a halftone binary bitmap file comprising:
   a) inputting a halftone binary bitmap file consisting of binary pixels to an asymmetric digital filter;
   b) filtering the binary pixels with the asymmetric digital filter and generating a multi-level pixels;
   c) comparing the multi-level pixel to a preset level and generating a binary pixel output;
   d) collecting the binary pixel output and forming an adjusted halftone binary bitmap file;
   e) printing the adjusted halftone binary bitmap file; and
   wherein the preset level is determined by a halftone bitmap screen angle.

20. A method for adjusting dot-gain for a halftone binary bitmap file comprising:
   a) inputting a halftone binary bitmap file consisting of binary pixels to an asymmetric digital filter;
   b) filtering the binary pixels with the asymmetric digital filter and generating a multi-level pixel;
   c) comparing the multi-level pixel to a preset level and generating a binary pixel output;
   d) collecting the binary pixel output and forming an adjusted halftone binary bitmap file;
   e) exposing a printing plate to the adjusted halftone binary bitmap file; and
   wherein the preset level is determined by the color separation that the halftone binary bitmap file represents.

21. The method of claim 20 wherein the halftone binary bitmap file is generated by a raster image processor.

22. The method of claim 20 wherein the halftone binary bitmap file is generated from a high resolution scan of a halftone film.

23. The method of claim 20 wherein the halftone binary bitmap file is at a resolution of between 600 dpi and 6000 dpi.

24. The method of claim 20 wherein the halftone binary bitmap file is at a resolution of between 1800 dpi and 3000 dpi.

25. The method of claim 20 wherein the halftone binary bitmap file has been processed at a halftone bitmap screen ruling and a halftone binary bitmap screen angle.

26. A method for adjusting dot-gain for a halftone binary bitmap file to maximize a number of output levels comprising:
   a) inputting a halftone binary bitmap file consisting of binary pixels to an asymmetric digital filter wherein the asymmetric filter is asymmetric in all directions;
   b) filtering the binary pixels with the asymmetric digital filter and generating a multi-level pixels;
   c) comparing the multi-level pixel to a preset level and generating a binary pixel output; and
   d) collecting the binary pixel output and forming an adjusted halftone binary bitmap file.

27. The method of claim 26 wherein the asymmetric digital filter is a size N by M. and provides N by M. unique quantization states in response to thresholding operations.

* * * * *